US011369981B2

(12) United States Patent
Lin et al.

(10) Patent No.: US 11,369,981 B2
(45) Date of Patent: Jun. 28, 2022

(54) WATER OUTFLOW CONTROL ASSEMBLY, SHOWER HEAD AND SHOWER HEAD ASSEMBLY METHOD

(71) Applicant: FUJIAN XIHE SANITARY WARE TECHNOLOGY CO., LTD., Fujian (CN)

(72) Inventors: Xiaofa Lin, Fujian (CN); Xiaoshan Lin, Fujian (CN); Zhigang Wan, Fujian (CN); Xiaoqing Deng, Fujian (CN); Qiqiao Liu, Fujian (CN)

(73) Assignee: FUJIAN XIHE SANITARY WARE TECHNOLOGY CO., LTD., Fujian (CN)

( * ) Notice: Subject to any disclaimer, the term of this patent is extended or adjusted under 35 U.S.C. 154(b) by 297 days.

(21) Appl. No.: 16/411,161

(22) Filed: May 14, 2019

(65) Prior Publication Data

US 2020/0147627 A1 May 14, 2020

(30) Foreign Application Priority Data

Nov. 14, 2018 (CN) .......................... 201811355100.0
Nov. 14, 2018 (CN) .......................... 201821876780.6

(51) Int. Cl.
*B05B 1/18* (2006.01)
*B05B 12/00* (2018.01)
*F16K 3/24* (2006.01)
*F16K 31/56* (2006.01)

(52) U.S. Cl.
CPC .............. *B05B 12/002* (2013.01); *B05B 1/18* (2013.01); *F16K 3/24* (2013.01); *F16K 31/563* (2013.01)

(58) Field of Classification Search
CPC . B05B 1/18; B05B 12/002; F16K 3/24; F16K 31/563
USPC ................................................ 239/433, 581.1
See application file for complete search history.

(56) References Cited

U.S. PATENT DOCUMENTS

| 8,276,833 | B2* | 10/2012 | Cheng | .................... E03C 1/0409 239/447 |
| 10,441,960 | B2* | 10/2019 | Rogers | ..................... B05B 1/185 |
| 2010/0264237 | A1* | 10/2010 | Engel | ...................... B05B 1/185 239/443 |
| 2011/0226876 | A1* | 9/2011 | Xu | ........................ B05B 1/1618 239/562 |

(Continued)

FOREIGN PATENT DOCUMENTS

CN 201618647 11/2010

*Primary Examiner* — Chee-Chong Lee
(74) *Attorney, Agent, or Firm* — JCIPRNET (57) ABSTRACT

A water outflow control assembly includes a water inlet body, a push rod, a rotor and an elastic member. The water inlet body is provided with a valve cavity. One end of the valve cavity is provided with a push rod hole for sliding of the push rod. The push rod is provided with push blocks. The rotor is provided with tooth blocks extending toward the push rod hole and matching with the push blocks, and a retaining wall with a gap. The retaining wall is in clearance fit with an inner wall of the valve cavity, and rotation of the rotor changes a degree that the retaining wall blocks a water inlet channel. By adopting the shower head with above mentioned assembly, the water outflow control assembly can be installed through a handle hole of a shower head body of a shower head.

16 Claims, 10 Drawing Sheets

(56) References Cited

U.S. PATENT DOCUMENTS

| | | | |
|---|---|---|---|
| 2012/0012676 A1* | 1/2012 | Hu | B05B 1/1663 |
| | | | 239/525 |
| 2017/0136473 A1* | 5/2017 | Yu | A47K 3/28 |
| 2020/0353486 A1* | 11/2020 | Lin | B05B 1/1663 |

* cited by examiner

WATER OUTFLOW CONTROL ASSEMBLY, SHOWER HEAD AND SHOWER HEAD ASSEMBLY METHOD

CROSS REFERENCE TO RELATED APPLICATIONS

This application claims the priority benefits of Chinese application no. 201811355100.0, filed on Nov. 14, 2018, and Chinese Application no. 201821876780.6, filed on Nov. 14, 2018. The entire contents of the above-mentioned patent applications are incorporated herein by reference in their entirety.

BACKGROUND OF THE INVENTION

1. Field of the Invention

The present application relates to the field of shower heads, and in particular, to a water outflow control assembly, a shower head and a shower head assembly method.

2. Description of Related Art

In the prior art, the water outflow of a shower head is generally adjusted by a button or the water is suspended by a button, so that the shower head has the characteristics of one-hand operation and accurate operation. Chinese utility model patent No. 200920181969.8 (Publication No. CN201618647U) published on Nov. 3, 2010 discloses a shower head water suspension control structure. The structure uses an axial displacement rotating mechanism driven by a button to drive a rotor to rotate, so that a retaining wall on the rotor is switched between blocking a water outlet and opening the water outlet to realize a water suspension function.

However, the shower head water suspension structure in the above patent application is complicated, a shower head body can only be manufactured separately, and the shower head water suspension structure is installed on a handle and then covered by the separately-manufactured shower head body, so that the shower head water suspension structure is installed into the shower head body. Since the shower head body can only be manufactured separately, a joint line is inevitably formed on the shower head body to affect the aesthetics, and dirt is easily hidden in the joint line during bathing. In the production process, the shower head body needs to be separately manufactured and then cover on and fix to the shower head water suspension structure installed on a handle, so the production cycle is long and the cost is high.

Secondly, when the button in the shower head water suspension structure is pressed to change an initial blocking state into an opened state, a relatively large pressing stroke is required to rotate the rotor. Although it is only a short wait, the user cannot get a better experience.

Thirdly, the applicant also intends to modify the shower head water suspension structure to suspend the water and adjust the flow, that is, at least one shift position can further be provided except the blocked water outlet position and the open water outlet position, so that a smaller amount of water outflow of the shower head can be achieved.

Fourth, since most of the shower heads are made of plastic parts, the shower head structure is generally required not to completely cut off the water, so as to avoid damage to the internal components of the shower head under over-high water pressure. Therefore, the shower head water suspension structure is further required to have a dripping function, that is, when the water outlet is completely blocked, a little water can still flow out. This is not only a matter of structural setting, but also puts forward a high requirement for dimensional tolerance in the manufacturing process, because a small dimensional error can cause large difference in the dripping flow rate. Accordingly, the structure needs to be further improved, so that the shower head water suspension structure having the dripping function is less sensitive to the dimensional tolerance or the assembly tolerance, and is easier to manufacture.

SUMMARY OF THE INVENTION

The following is the summary of the subject matter detailed in the present application. The summary is not intended to limit the scope of the claims.

The present application provides a water outflow control assembly, a shower head and a shower head assembly method, where the water outflow control assembly can stretch into a handle hole of a shower head body and is directly combined with a panel assembly. After achieving this objective, the present invention is also intended to achieve a quick opening function, a flow adjustment function and a dripping function.

The present application adopts the following technical solutions:

A water outflow control assembly is adapted to be installed from a handle hole of a shower head body, and includes: a water inlet body, provided with a water inlet channel and a valve cavity that intersects with the water inlet channel, one end of the valve cavity being provided with a push rod hole, and a plurality of guide blocks being arranged around the push rod hole; a push rod, penetrating through the push rod hole and non-rotatably connected to the water inlet body in a sealing and sliding manner, a plurality of push blocks being arranged at one end of the push rod extending into the valve cavity; a rotor, provided with a plurality of tooth blocks that extend toward the push rod hole and that have inclined surfaces, a retaining wall extending toward the push rod hole and provided with a gap being further arranged on an outer periphery of the rotor, the retaining wall being in clearance fit with an inner wall of the valve cavity, and a rotation of the rotor changing an area of the water inlet channel being blocked by the retaining wall; and an elastic member, resisting between the rotor and the other end of the valve cavity; where when the push rod is pressed, the push blocks urge against the tooth blocks at a stop position, so that the rotor moves axially and rotates; and when the push rod is released, the elastic member drives the rotor to reset axially, and the tooth blocks resist the guide blocks and continue to rotate to a next stop position. Since the technical solution changes the design scheme in the background art that the retaining wall of the rotor and the tooth blocks extend in opposite directions, a thickness of the rotor is reduced, and the entire water outflow control assembly can be installed into the shower head body from the handle hole of the shower head body.

A shower head includes a shower head body, a surface cover assembly, a button, and the above water outflow control assembly. The shower head body is provided with a surface cover hole, a handle hole and a button hole, and the button hole is formed in a handle of the shower head body; the surface cover assembly is installed from the surface cover hole of the shower head body and then is fixedly connected to the shower head body; the water outflow control assembly is installed from the handle hole of the shower head body and then is fixedly connected to the shower head body, the water inlet channel is hermetically communicated with a water outlet channel of the surface cover assembly, and the push rod is opposite to the button hole; and the button is installed at a position of the button hole and is fixedly connected to the push rod. Since the water outflow control assembly can be installed from the handle hole of the shower head body, the shower head is more attractive and does not hide dirt.

A shower head assembly method is provided, a water outflow control assembly of a shower head is installed through a handle hole of a shower head body, so as to be connected to and communicate with a surface cover assembly which is installed from a surface cover hole of the shower head body, and the push rod of the water outflow control assembly is opposite to the button hole of the shower head body, so that the manufacturing process of the shower head is simpler.

BRIEF DESCRIPTION OF THE DRAWINGS

To make the technical solutions of the present application more comprehensive, the accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The following clearly and completely describes the technical solutions in the embodiments of the present application with reference to the accompanying drawings in the embodiments of the present application. Apparently, the described embodiments are exemplary embodiments of the present application, and should not be considered as exclusions of other embodiments. All other embodiments obtained by those of ordinary skill in the art without creative efforts based on the embodiments of the present application shall fall within the scope of the present application.

Figure 1:
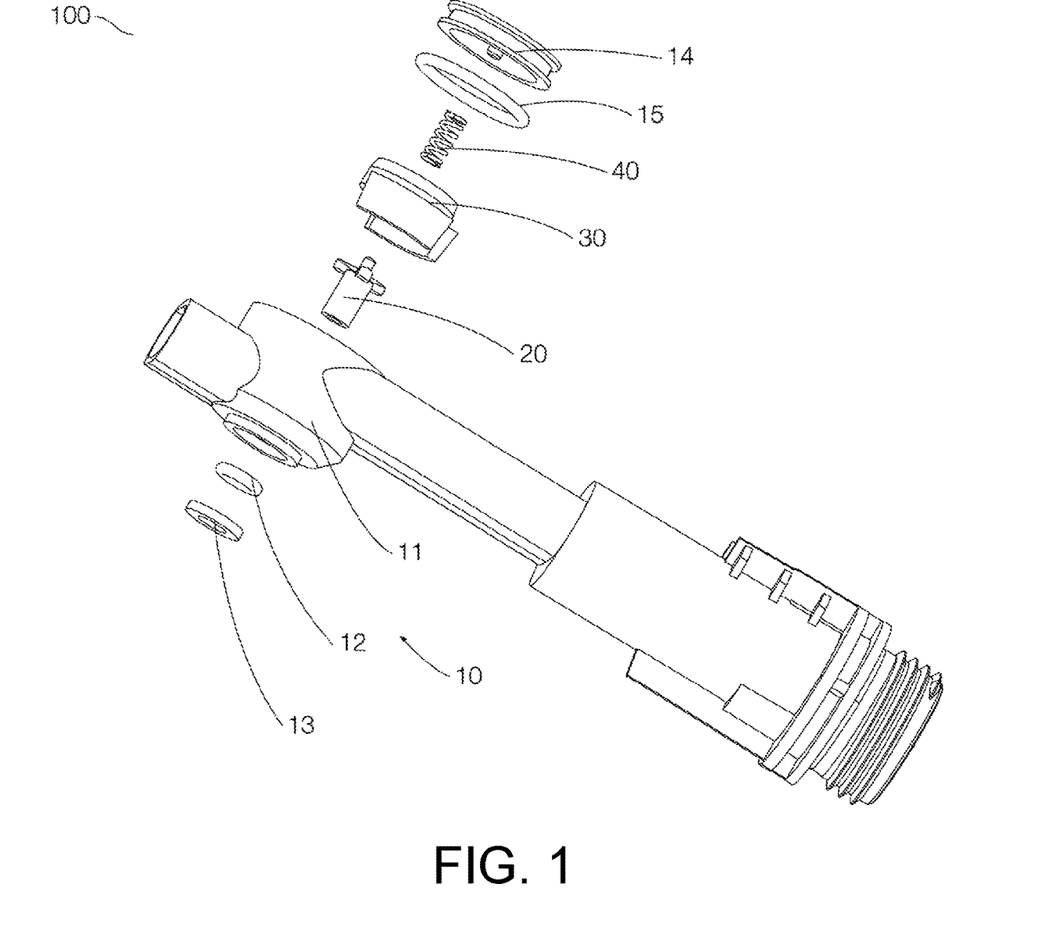
FIG. 1 is an exploded perspective view of a water outflow control assembly according to a first embodiment of the disclosure.

Referring to FIG. 1, FIG. 1 shows various components in a first embodiment of a water outflow control assembly according to the present application. As shown in FIG. 1, in the first embodiment of the water outflow control assembly, the water outflow control assembly includes a water inlet body 10, a push rod 20, a rotor 30, and an elastic member 40.

Referring to FIGS. 1, 2, 3, 4 and 10, the water inlet body 10 includes a water inlet seat 11, a first sealing ring 12, a first end cap 13, a second end cap 14, and a second sealing ring 15, as shown in the figures.

Figure 2:
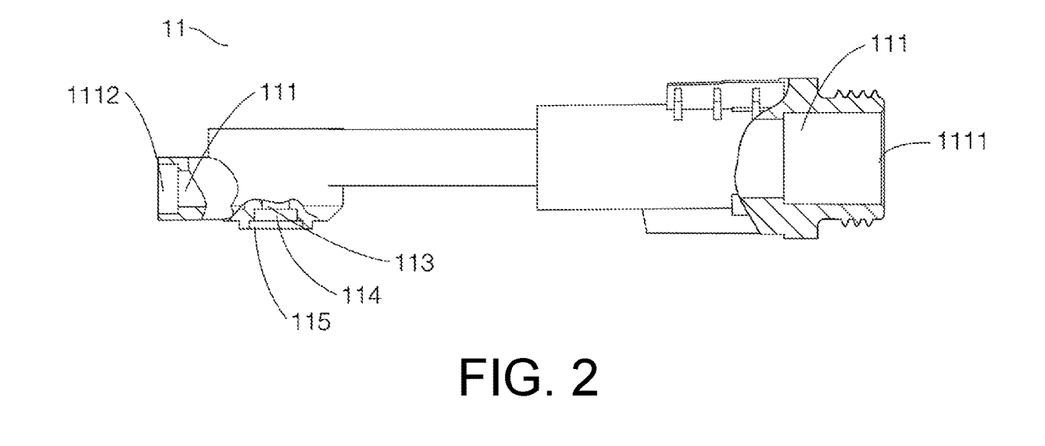
FIG. 2 is a fragmentary sectional view of a water inlet seat of the water outflow control assembly according to the first embodiment of the disclosure.
Figure 3:
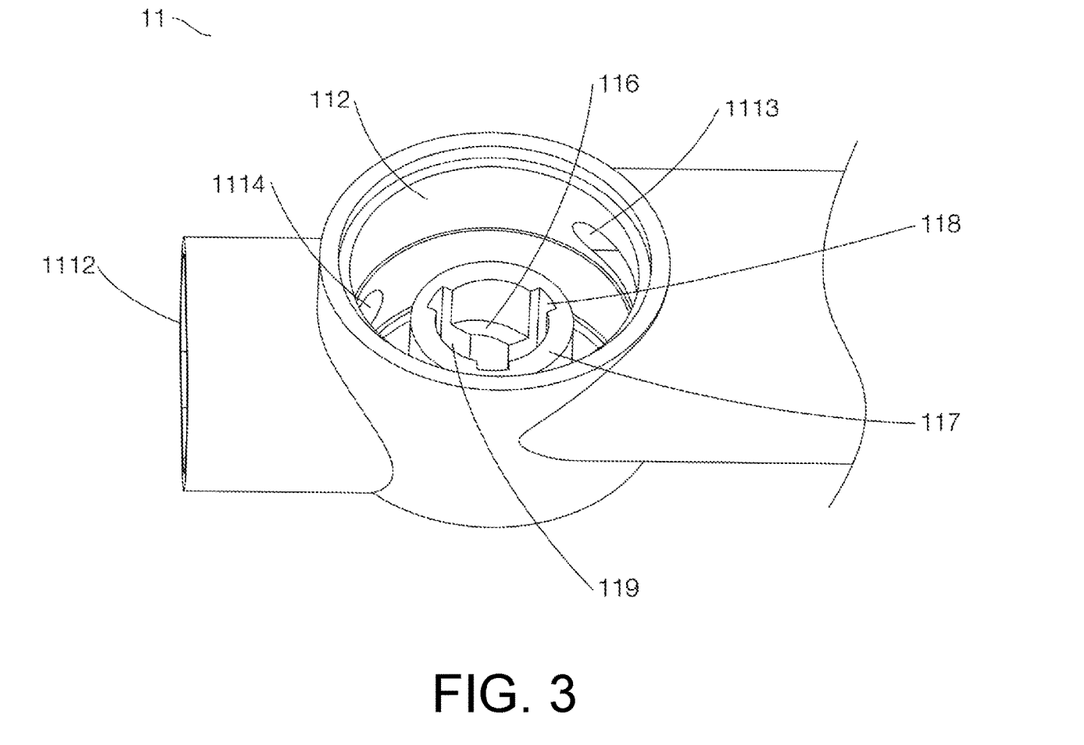
FIG. 3 is a fragmentary perspective view of the water inlet seat of the water outflow control assembly according to the first embodiment of the disclosure.

As shown in FIGS. 2 and 3, the water inlet seat 11 is provided with a water inlet channel 111 and a valve cavity groove 112 intersecting with the water inlet channel. In the present embodiment, the water inlet channel 111 includes a water inlet section and a water outlet section, where one end of the water inlet section is a water inlet end 1111 for communicating with a water inlet hose (not shown) of a hand-held shower head, and the other end of the water inlet section intersects with the valve cavity groove 112 to form a water inlet hole 1113; one end of the water outlet section intersects with the valve cavity groove 112 to form a water outlet hole 1114, and the other end of the water outlet section is a water outlet end 1112 for communicating with a water outlet channel (not shown) in a panel assembly 300. As shown in FIG. 3, in various embodiments of the present application, the valve cavity groove 112 is in the shape of a cylinder that is closed at one end and open at the other end, and its axis is perpendicular to the water inlet channel 111. As shown in FIG. 2, the closed end of the valve cavity groove 112 is provided with a push rod hole 113; a periphery of a side of the push rod hole 113 away from the valve cavity groove 112 is further provided with a first sealing ring groove 114 and a first end cap groove 115, where the first sealing ring groove 114 is relatively inward and has a smaller diameter for accommodating the first sealing ring 12, and the first end cap groove 115 is relatively outward and has a larger diameter for placing the first sealing ring 12 into the first sealing ring groove 114. As shown in FIG. 3, within the valve cavity groove 112, guide blocks 116 extending toward the open end of the valve cavity groove 112 are arranged around the push rod hole 113. In various embodiments of the present application, the guide blocks 116 are arranged radially and a number thereof is three. Each of the guide blocks 116 is provided with an inclined surface. Of course, the inclined surface of the guide blocks 116 is not necessary, and may be, for example, a plane. Partition grooves 119 are formed between every two of the three guide blocks 116 at intervals. Of course, number of the partition grooves 119 may be three. It can also be seen from FIG. 3 that stop walls 117 extending toward the open end of the valve cavity groove 112 are also provided around the guide blocks 116, and it can be known from FIG. 3 that an extending length of the stop walls 117 is greater than that of the guide blocks 116. An inner wall of the stop walls 117 is provided with stop grooves 118. In various embodiments of the present application, three stop grooves 118 are provided, correspond to the partition grooves 119 one by one, and have equal width.

As shown in FIG. 1, the first sealing ring 12 is arranged in the first sealing ring groove 114, and has an inner diameter smaller than that of the push rod hole 113, so that the push rod 20 is hermetically connected with the water inlet seat 11.

As shown in FIG. 1, the first end cap 13 has a through hole in the middle for allowing a push rod body 21 to pass therethrough. The first end cap 13 is fixedly connected into the first end cap groove 115 to restrict outward displacement of the first sealing ring 12 in an axial direction. In the present embodiment, after the first end cap 13 is installed in the first sealing ring 12, the first end cap 13 is fixedly connected to the water inlet seat 11 by plastic welding.

Figure 4:
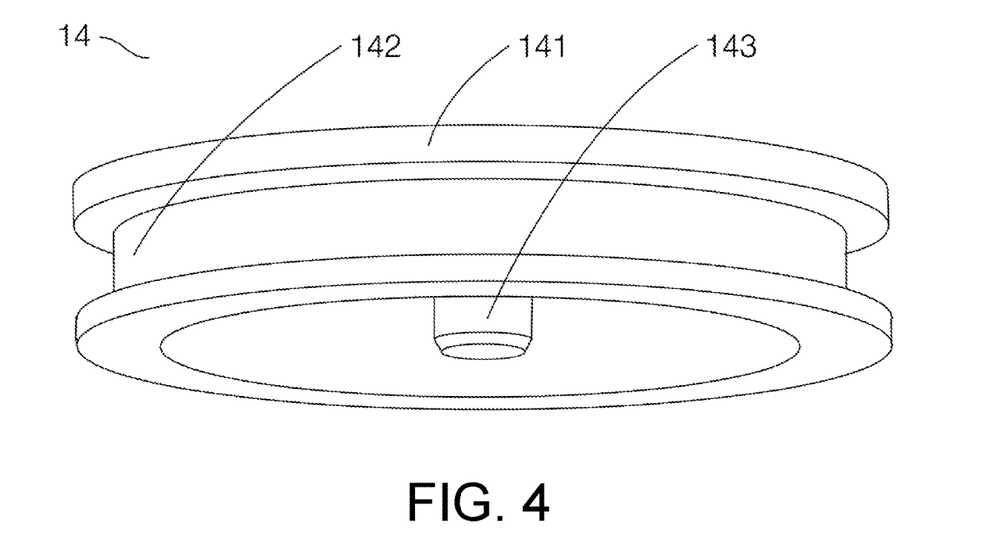
FIG. 4 is a perspective view of a second end cap of the water outflow control assembly according to the first embodiment of the disclosure.

As shown in FIG. 4, the second end cap 14 includes a second end cap body 141 and a protruding column 143. The second end cap body 141 is of a cylindrical structure with one end closed and the other end open. The protruding column 143 is located in a centre of the cylindrical structure, and extends in the same direction as a wall of the cylindrical structure. The protruding column 143 is used for positioning an elastic member 40 (in the present embodiment, the elastic member 40 is a return spring). A second sealing ring groove 142 is formed in an outer side of the wall of the cylindrical structure of the second end cap body 141, and the second sealing ring 15 is embedded into the second sealing ring groove 142.

Figure 10:
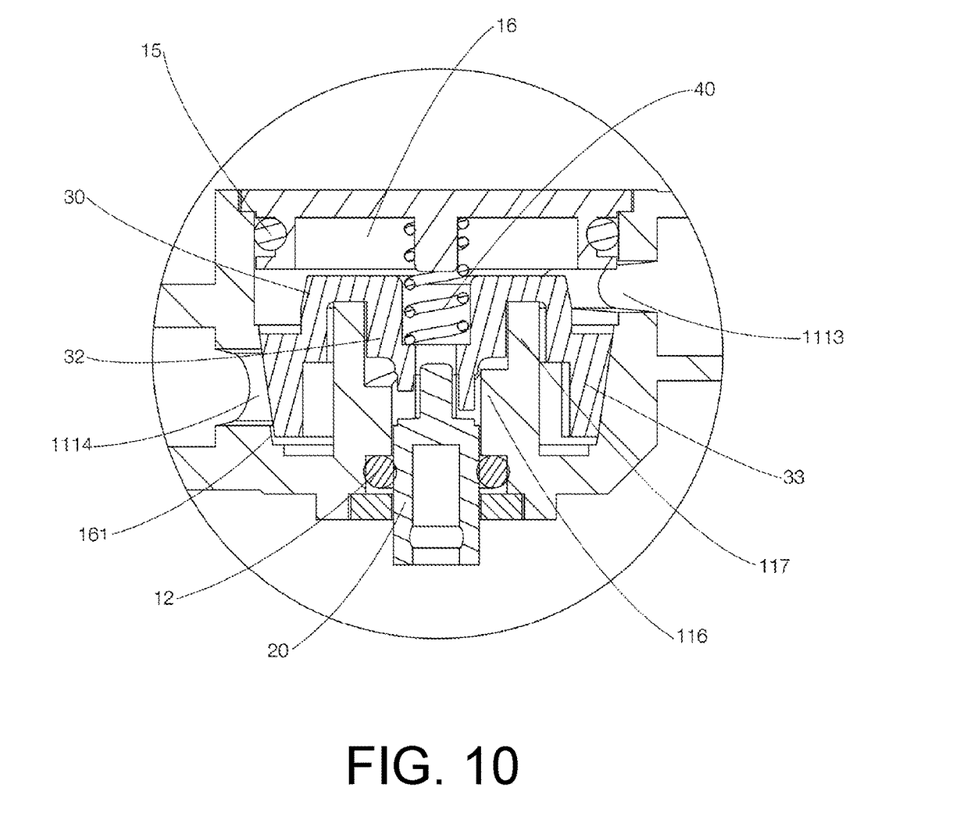
FIG. 10 is a fragmentary enlarged view of region E in FIG. 9, illustrating that a clearance adapted for forming a dripping channel according to the first embodiment.
Figure 11:
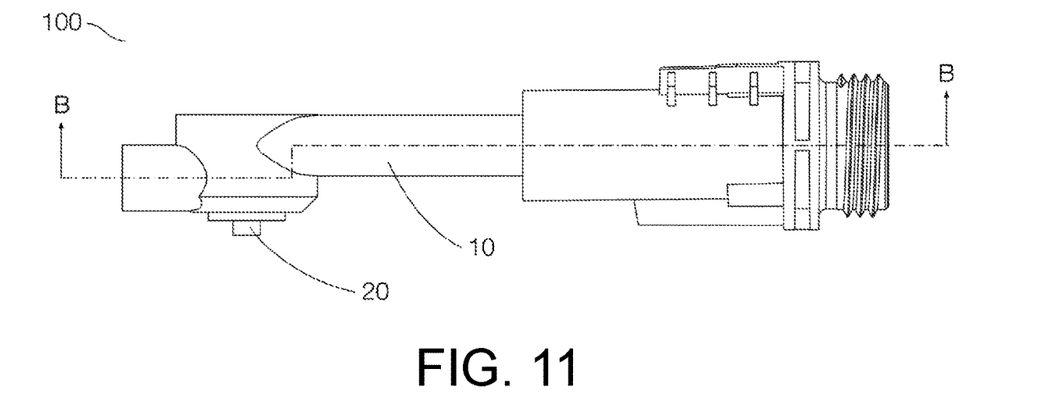
FIG. 11 is a main view of the water outflow control assembly according to the first embodiment of the disclosure.

As shown in FIG. 10, before the second end cap 14 is installed, the push rod 20 and the rotor 30 are required to be installed into the valve cavity groove 112, the elastic member 40 is placed on the protruding column 143, and then the second end cap 14 carrying the second sealing ring 15 is hermetically fixed to the open end of the valve cavity groove 112. After the second end cap 14 is installed, the open end of the valve cavity groove 112 is also closed, and the water inlet seat 11 matches with the second end cap 14 to form a valve cavity 16.

Figure 5:
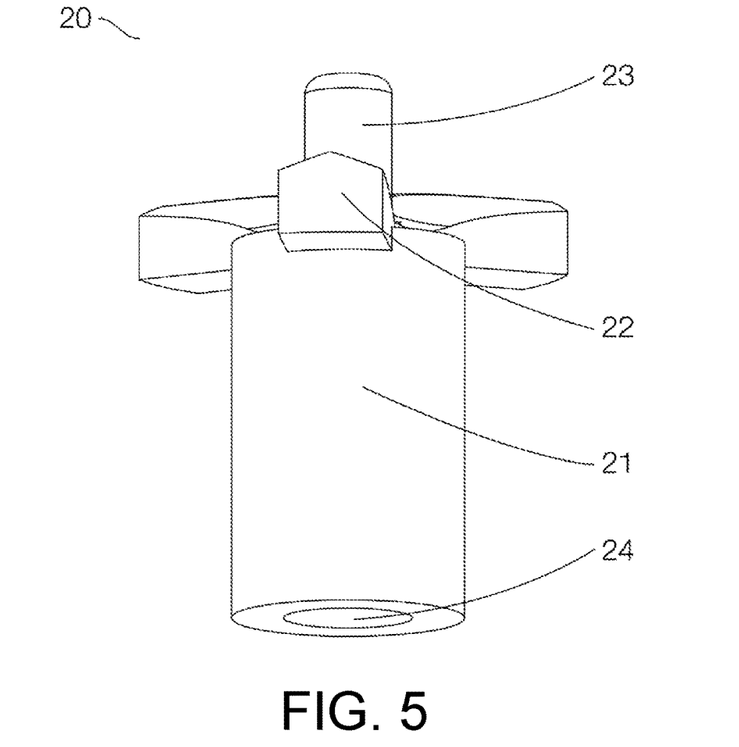
FIG. 5 is a perspective view of a push rod of the water outflow control assembly according to the first embodiment of the disclosure.

As shown in FIG. 5, the push rod 20 includes a push rod body 21, push blocks 22, and a mandrel 23. As shown in FIG. 10, the push rod body 21 penetrates through the aforementioned push rod hole 113 and is hermetically connected to the push rod hole 113 in a sliding manner through the first sealing ring 12. The push blocks 22 facing the second end cap 14 are connected to an end of the push rod body 21 which extends into the valve cavity 16. As shown in FIG. 5, in the present embodiment, three push blocks 22 are provided and extend radially from the push rod body 21. Widths of the push blocks 22 are configured to be in clearance fit with the partition grooves 119 and the stop grooves 118, such that the push blocks 22 slide along the stop grooves 118 and the partition grooves 119, and meanwhile the push blocks 22 are non-rotatably connected to the water inlet body 10 due to such structure. It should be noted that, based on the present structure, the push blocks 22 can be configured to slide out or not slide out of the partition grooves 119 in an axial displacement stroke, and therefore, configurations of the stop walls 117 and the stop grooves 118 are not essential. Of course, in the presence of the stop walls 117 and the stop grooves 118, the push blocks 22 can be slid out of the partition grooves 119, so that the stroke is larger. As shown in FIG. 5, in the present embodiment, one side of the push block 22 facing the second end cap 14 is wedge-shaped, that is, two inclined surfaces form an obtuse angle; but this shape is not necessary, the push block 22 may have a single inclined surface or a cylindrical surface, or even have a plane perpendicular to an axis of the push rod body 21, as long as a mating surface of the tooth block 32 is an inclined surface, the relative abutment between the push block 22 and the tooth block 32 enables the tooth block 32 to rotate. It should be noted that, as shown in FIG. 5 and FIG. 10, in the present embodiment, an end surface of one end of the push rod body 21 extending out of the valve cavity 16 is further provided with a button mounting hole 24 extending axially, and a column shaft of the button 400 can be inserted into the button mounting hole 24 to complete the fixed connection of the button 400 and the push rod 20. The mandrel 23 is arranged at one end of the push rod body 21 toward the second end cap 14, extends in an axial direction of the push rod body 21, and matches with a mandrel hole 36 of the rotor 30 to ensure that a rotation axis of the rotor 30 is consistent with the axis of the push rod body 21.

Figure 6:
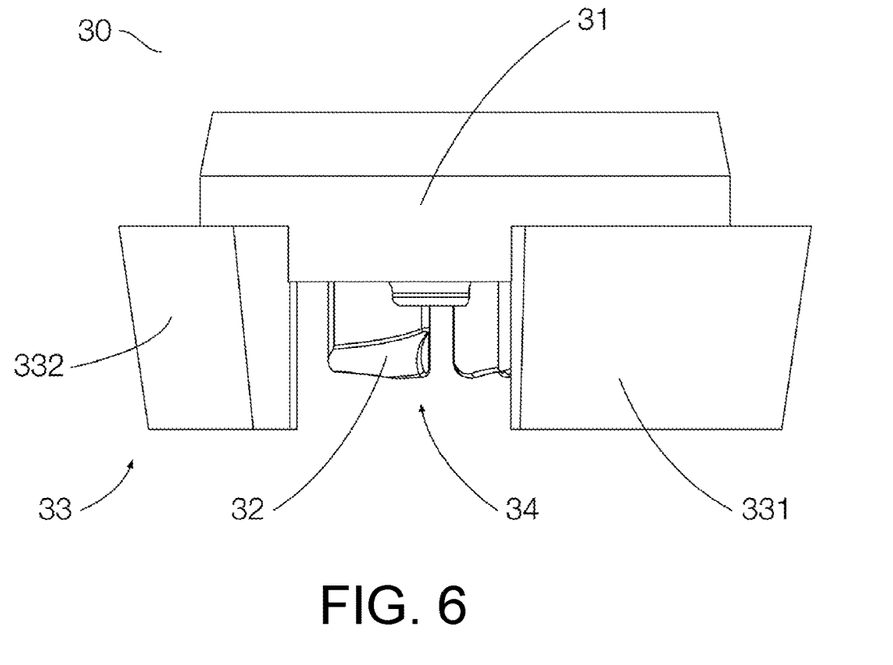
FIG. 6 is a main view of a rotor of the water outflow control assembly according to the first embodiment of the disclosure.
Figure 7:
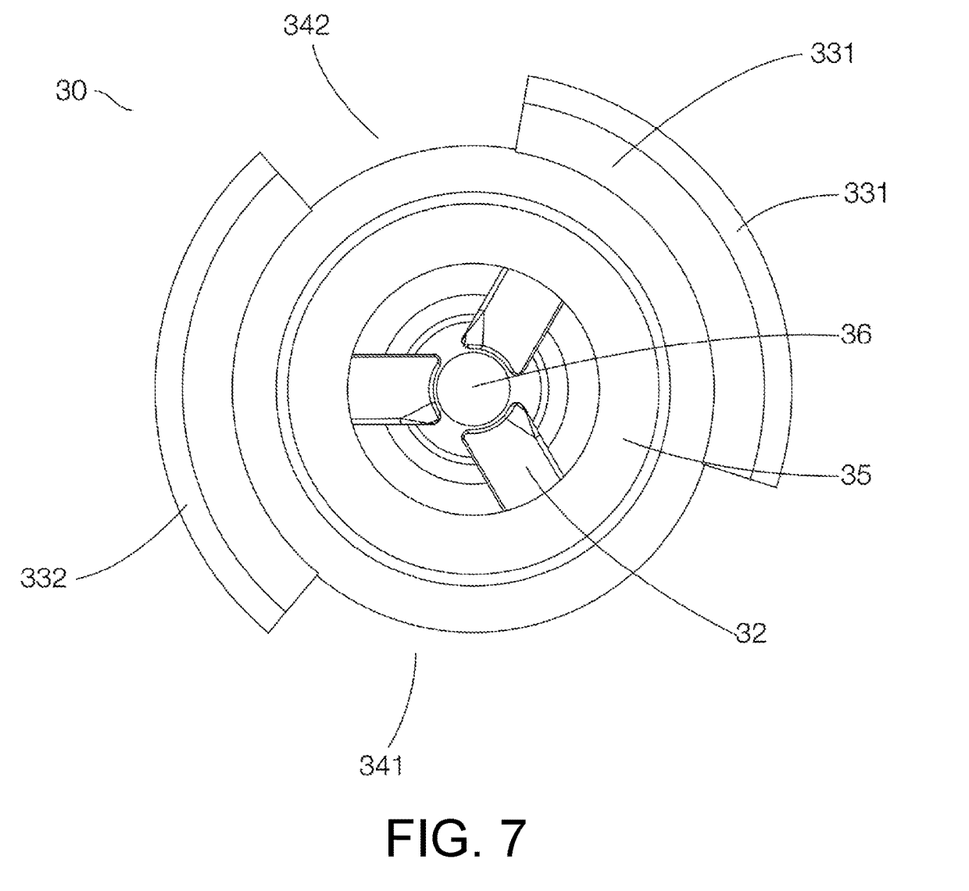
FIG. 7 is a bottom view of the rotor of the water outflow control assembly according to the first embodiment of the disclosure.

As shown in FIG. 6 and FIG. 7, the rotor 30 is provided with a rotor body 31. In the present embodiment, the rotor body 31 can be regarded as being formed by connecting a disc with a cylindrical protruding block extending toward the push rod hole 113 in a centre of the disc into a whole. The cylindrical protruding block of the rotor body 31 is provided with the mandrel hole 36 facing the push rod hole 113 to match with the mandrel 23, and an accommodating hole facing the second end cap 14 to accommodate the elastic member 40. Three tooth blocks 32 are radially arranged at intervals at a periphery of the cylindrical protruding block. A width of each tooth block 32 matches with a partition groove 119, so that the tooth block 32 can slide along the partition groove 119. The surfaces of the free ends of the tooth blocks 32 facing the push blocks 22 and the guide blocks 116 are inclined surfaces, so that a jacking force perpendicular to the inclined surfaces is produced when the tooth blocks 32 urge against the push blocks 22 or the guide blocks 116. The jacking force can be decomposed into an axial force and a tangential force, where when the tooth blocks 32 urge against the push blocks 22, the axial force enables the tooth blocks 32 to move toward the second end cap 14, and the tangential force enables the tooth blocks 32 to drive the whole rotor 30 to rotate around a rotating shaft defined by the mandrel 23; and when the tooth blocks 32 urge against the guide blocks 116, the axial force and the tangential force co-act, so that the tooth blocks 32 drive the rotor 30 to slide into the partition grooves 119. A retaining wall 33 extending toward the push rod hole 113 and having a gap 34 is further arranged on an outer periphery of the disc in the rotor body 31. In a first embodiment, two retaining walls which are respectively a first retaining wall 331 and a second retaining wall 332 are provided. A first gap 341 and a second gap 342 are formed between the first retaining wall 331 and the second retaining wall 332. It can be known from FIG. 7 that the first retaining wall 331, the first gap 341, the second retaining wall 332 and the second gap 342 are sequentially and clockwise arranged, where the cross sections of the first retaining wall 331 and the second retaining wall 332 can be regarded as two concentric arcs of the same radius. In the present embodiment, outer walls of the first retaining wall 331 and the second retaining wall 332 are both conical surfaces, specifically, a radius of one end near the push rod hole 113 is smaller than a radius of one end near the rotor body 31, that is, a cone top of the conical surface points the push rod hole 113. At the same time, in correspondence with the first retaining wall 331 and the second retaining wall 332, an inner wall of the valve cavity 16 near the water outlet hole 1114 is also formed as a conical surface, and is in clearance fit with the first retaining wall 331 and the second retaining wall 332. More specifically, as shown in FIG. 7, in the present embodiment, a segmental arc of the first retaining wall 331 has a central angle of substantially 100 degrees, a segmental arc of the first gap 341 has a central angle of substantially 110 degrees, a segmental arc of the second retaining wall 332 has a central angle of substantially 100 degrees, and a segmental arc of the second gap has a central angle of substantially 50 degrees. In addition, an accommodating groove 35 for accommodating the stop wall 117 is formed between the retaining wall 34 and the tooth blocks 32.

The elastic member 40 is arranged on the protruding column 143 and is supported between a bottom surface of the rotor body 31 and a cylindrical bottom of the second end cap body 141.

Referring to FIG. 1, in the present embodiment, an assembly method of the water outflow control assembly 100 is as follows:

Step 1, placing the first sealing ring 12 into the first sealing ring groove 114;

Step 2, welding the first end cap 13 into the first end cap groove 115, so that the first sealing ring 12 cannot move axially;

Step 3, enabling the push rod 20 to pass through the push rod hole 21 and the first sealing ring 12 from the valve cavity groove 112 in such a direction that the button mounting hole 24 is forward and the push blocks 22 are backward, and to extend out of the through hole in the first end cap 13, and engaging the push blocks 22 into the partition grooves 119 and the stop grooves 118 until the push blocks 22 abut the bottoms of the partition grooves 119;

Step 4, aligning the mandrel hole 36 of the rotor 30 with the mandrel 23, keeping the retaining wall 33 and the tooth blocks 32 facing the push rod hole 113, pushing the rotor 30 toward the push rod hole 113, and slightly rotating the rotor 30 to engage the tooth blocks 32 into the partition grooves 119;

Step 5, covering the protruding column 143 with the elastic member 40 to face the accommodating hole;

Step 6, sleeving the second sealing ring groove 142 with the second sealing ring 15; and Step 7, fixing the second end cap 14 to the open end of the valve cavity groove 112.

Figure 8:
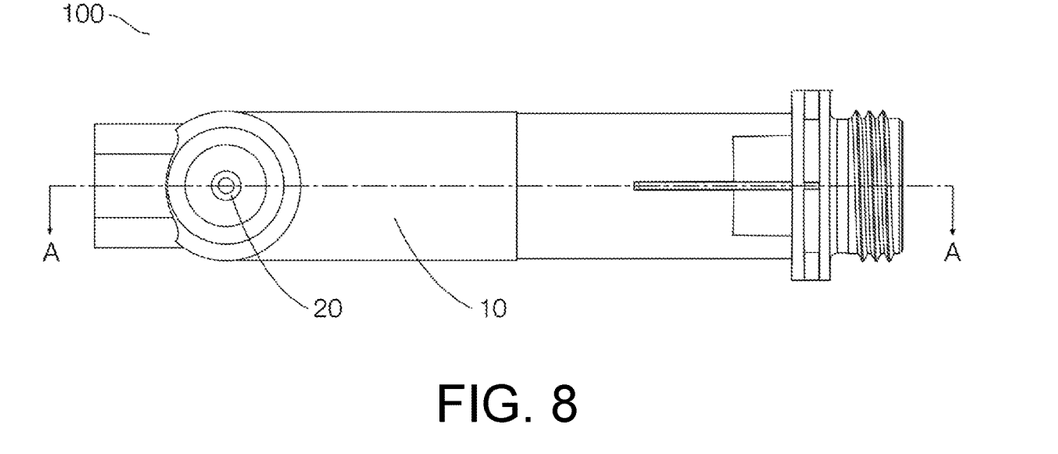
FIG. 8 is a bottom view of the water outflow control assembly according to the first embodiment of the disclosure.
Figure 9:
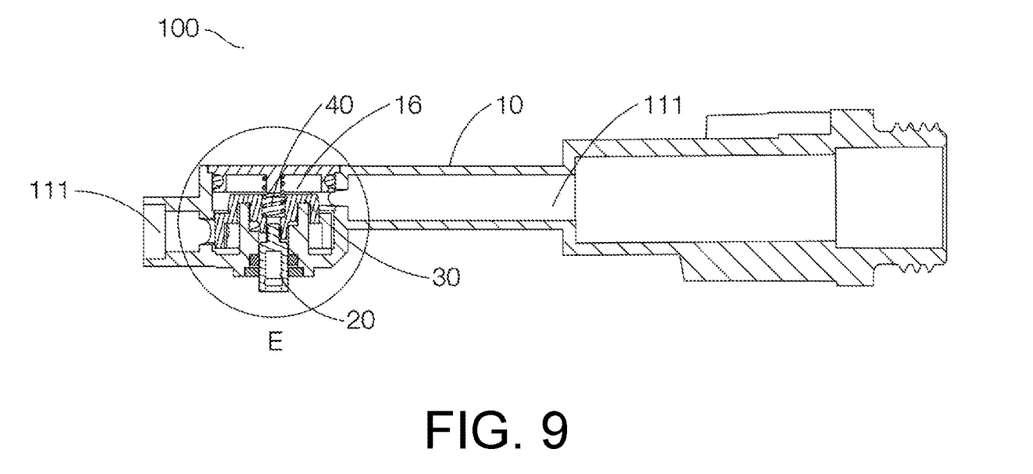
FIG. 9 is a sectional view taken from line A-A in FIG. 8, illustrating an internal structure of the water outflow control assembly according to the first embodiment of the disclosure.

After the assembly is completed, the structure of the water outflow control assembly 100 is shown in FIGS. 8, 9 and 10. The push blocks 22 are placed in the stop grooves 118 and the partition grooves 119, and the tooth blocks 32 are also placed in the partition grooves 119. The retaining wall 33 is in clearance fit with the inner wall of the valve cavity 16 near the water outlet hole 1114, and a clearance 161 is 0.1 mm to 0.4 mm, and is 0.3 mm in the present embodiment. The rotor 30 is jacked by the elastic member 40 and floats in the valve cavity 16. It can be seen from FIG. 9 and FIG. 21 that an extending direction of the retaining wall 33 is the same as that of the tooth blocks 32, a thickness of the rotor 30 is reduced, and a thickness of the valve cavity 16 is further reduced, so that the entire water outflow control assembly 100 can be installed from a handle hole 220 of a shower head body 200 and connected to a panel assembly 300.

Figure 12:
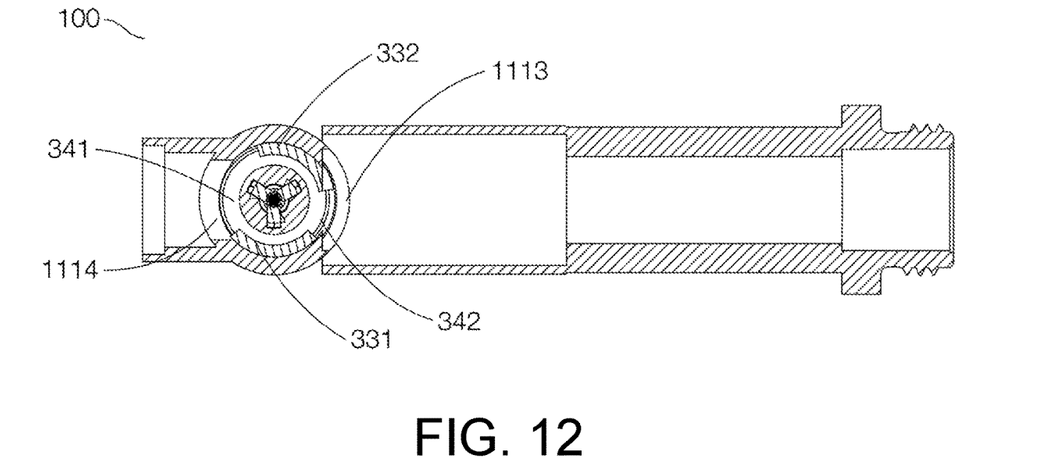
FIG. 12 is a sectional view taken from line B-B in FIG. 11, illustrating that when the rotor of the first embodiment is located at a first stop position.

Specifically, the push rod 20 is driven to realize a dripping function, a quick opening function and a flow adjustment function as follows:

Refer to FIG. 11 to FIG. 14. FIG. 12 shows a relationship among the retaining wall 33, the gap 34, the water inlet hole 1113, and the water outlet hole 1114 when the rotor 30 is at a first stop position. At the first stop position, the tooth blocks 32 are located in the partition grooves 119, the first gap 341 is opposite to the water outlet hole 1114, the second gap 332 is opposite to the water inlet hole 1113, both the first retaining wall 331 and the second retaining wall 332 do not block the water outlet hole 1114, and water can pass through the water outlet hole 1114 from the water inlet hole 1113 through the valve cavity 16 and the rotor 30.

Figure 13:
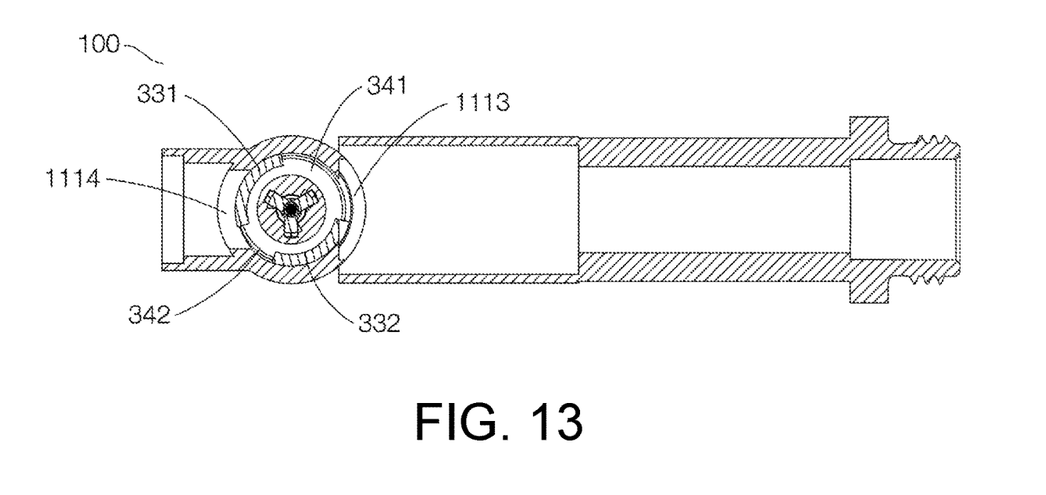
FIG. 13 is a sectional view taken from line B-B in FIG. 11, illustrating that when the rotor of the first embodiment is located at a second stop position.

FIG. 13 shows a relationship among the retaining wall 33, the gap 34, the water inlet hole 1113, and the water outlet hole 1114 when the rotor 30 is at a second stop position. The push rod 20 is pressed from the first stop position, the push blocks 22 press against the inclined surfaces of the tooth blocks 32 at the first stop position, and the rotor 30 moves axially toward the second end cap 14 until the tooth blocks 32 are completely separated from the partition grooves 119 and then rotate clockwise as shown in FIG. 13. The push rod 20 is released, the elastic member 40 drives the rotor 30 to move axially toward the push rod hole 113 until the inclined surfaces of the tooth blocks 32 resist the guide blocks 116, therefore the tooth blocks 32 continue to rotate clockwise as shown in FIG. 13 until the tooth blocks 32 rotate to the partition grooves 119, and the tooth blocks 32 continue to move axially under the action of the elastic member 40, such that the tooth blocks 32 engages into the partition grooves 119 to reach the second stop position. At this time, the first retaining wall 331 blocks about 60% of area of the water outlet hole 1114, half of the first gap 341 is opposite to the water inlet hole 1113, the second retaining wall 332 blocks about 40% of area of the water inlet hole 1113, and about half of the second gap 342 is opposite to the water outlet hole 1114. From the first stop position to the second stop position, the rotor 30 rotates clockwise by approximately 120 degrees as shown in FIG. 13, thereby switching the water volume from maximum to approximately 40% of the maximum, that is, the flow adjustment function can be realized by the above operations.

Figure 14:
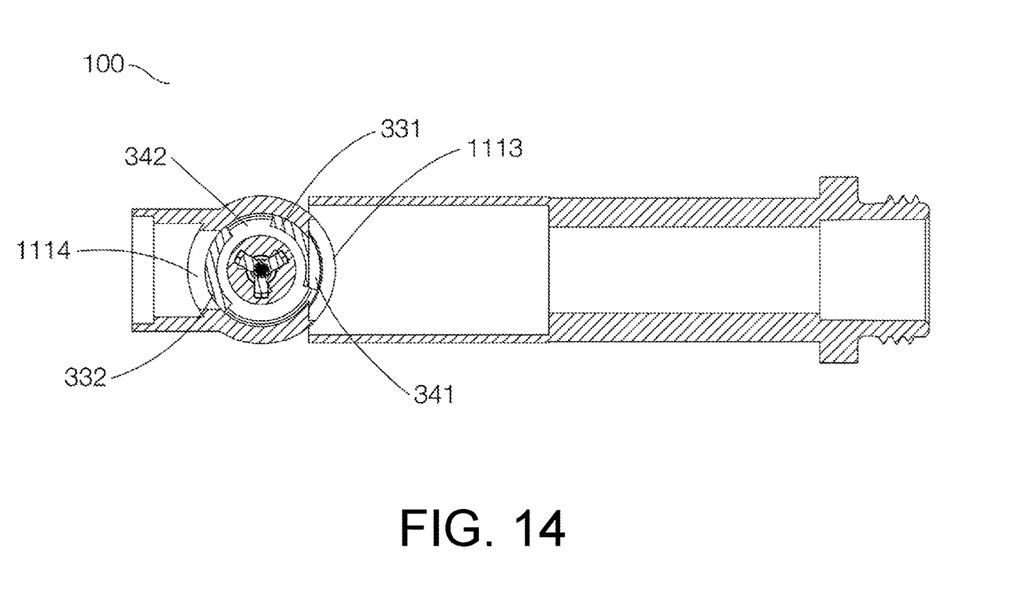
FIG. 14 is a sectional view taken from line B-B in FIG. 11, illustrating that when the rotor of the first embodiment is located at a third stop position.
Figure 15:
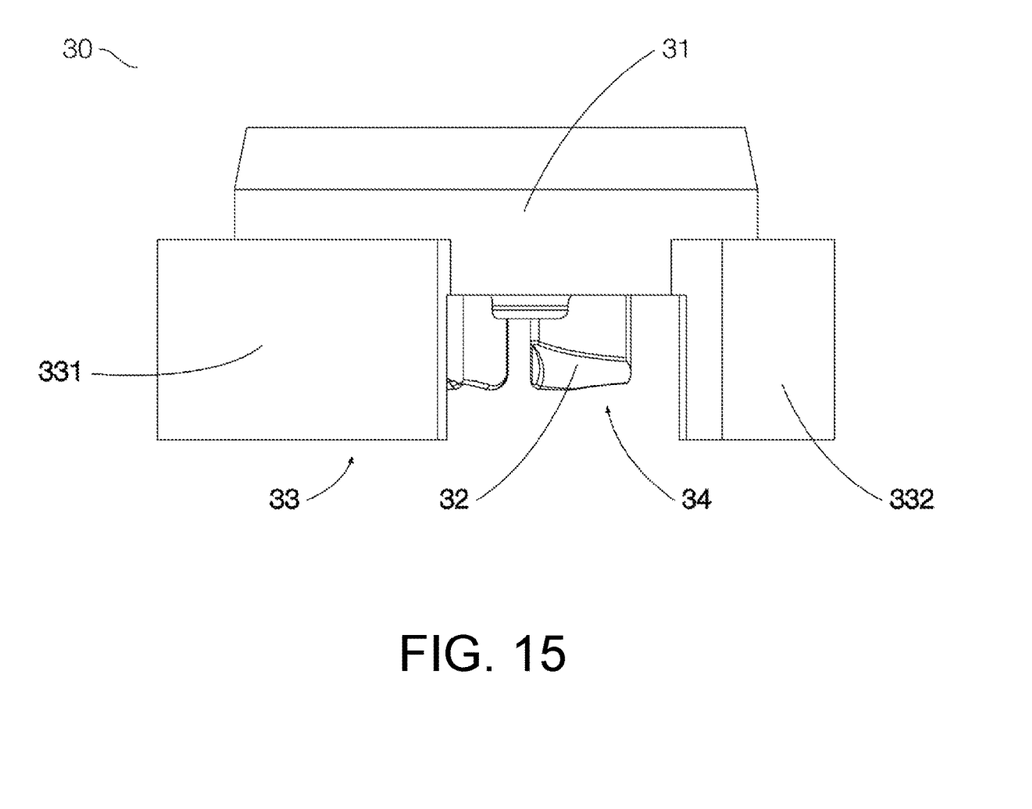
FIG. 15 is a main view of the rotor of the water outflow control assembly according to a second embodiment of the disclosure.
Figure 16:
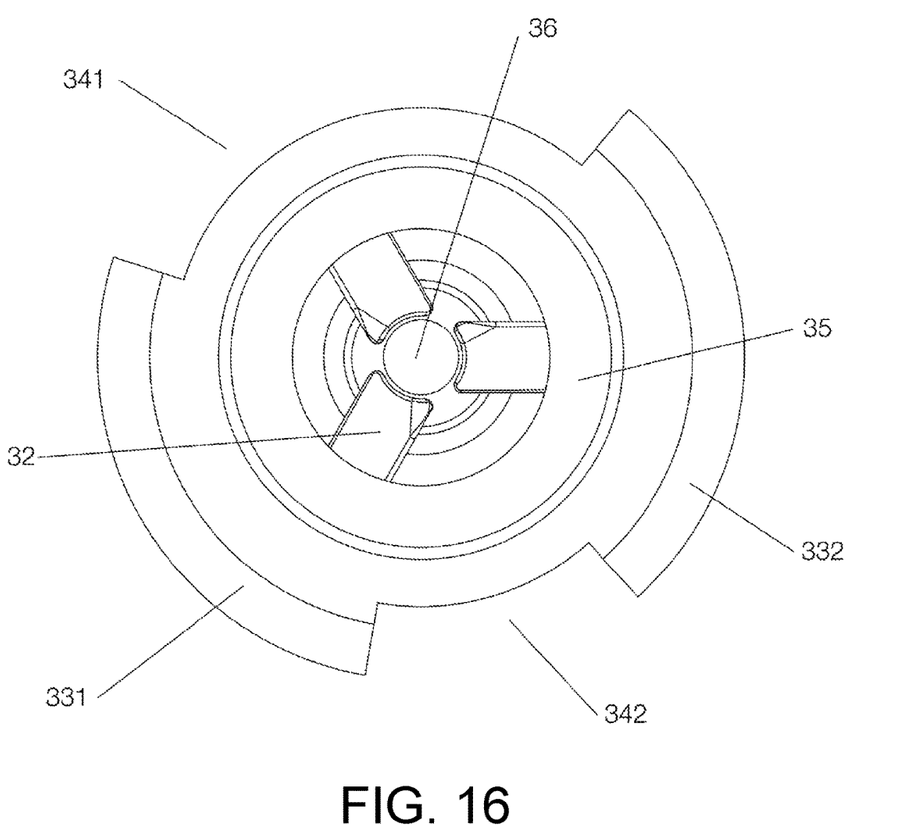
FIG. 16 is a bottom view of the rotor of the water outflow control assembly according to the second embodiment of the disclosure.
Figure 17:
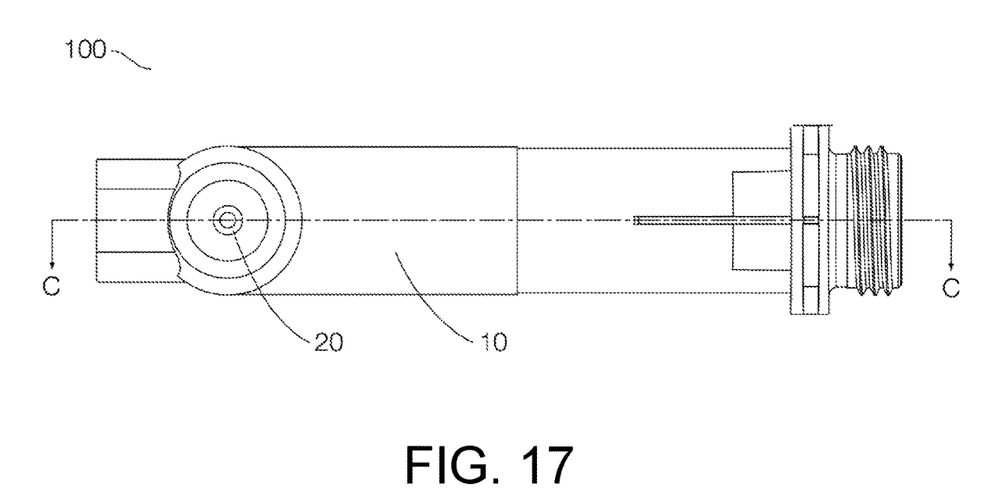
FIG. 17 is a bottom view of the water outflow control assembly according to the second embodiment of the disclosure.
Figure 18:
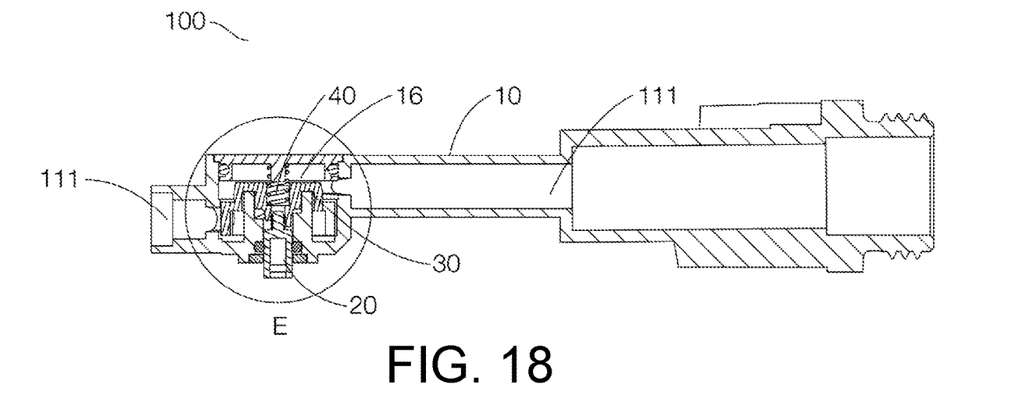
FIG. 18 is a sectional view taken from line C-C in FIG. 17, illustrating an internal structure of the water outflow control assembly according to the second embodiment of the disclosure.
Figure 19:
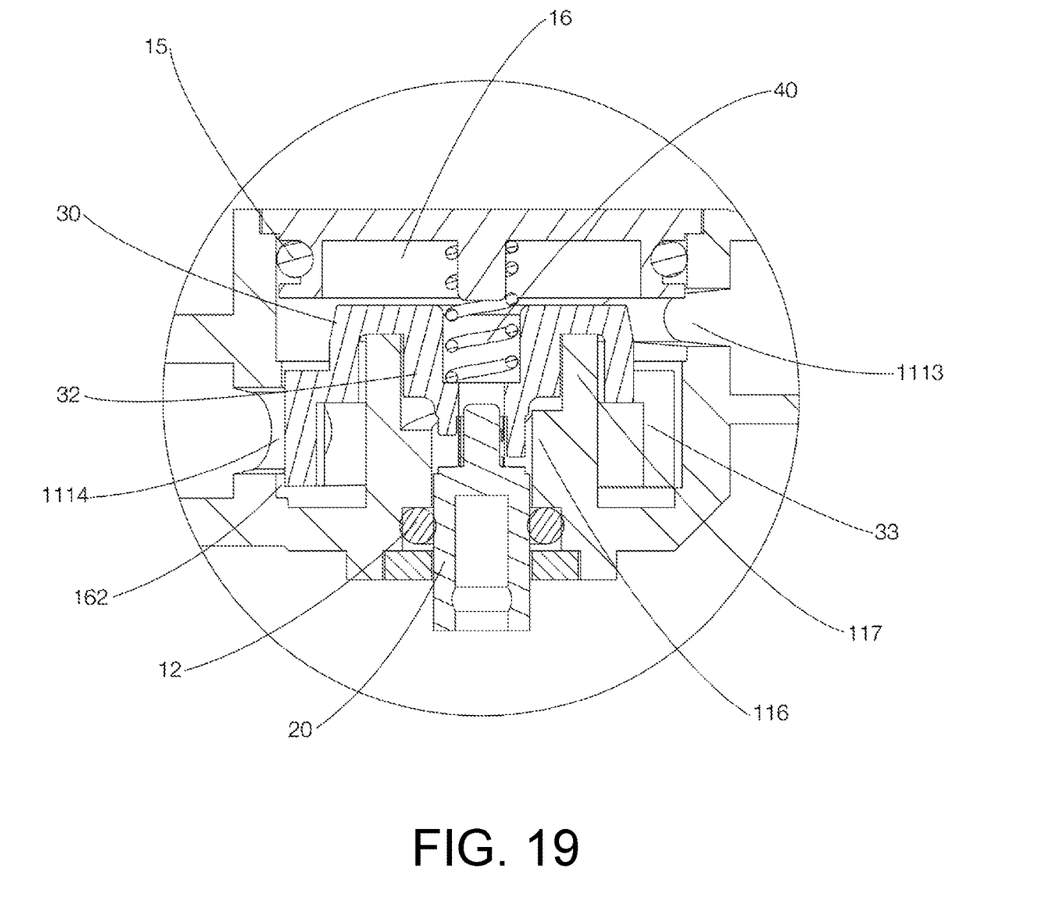
FIG. 19 is a fragmentary enlarged view of region E in FIG. 18, illustrating a dripping groove adapted for forming the dripping channel.

FIG. 14 shows a relationship among the retaining wall 33, the gap 34, the water inlet hole 1113, and the water outlet hole 1114 when the rotor 30 is at a third stop position. The push rod 20 is pressed from the second stop position, the push blocks 22 press the inclined surfaces of the tooth blocks 32 at the second stop position, and the rotor 30 moves axially toward the second end cap 14 until the tooth blocks 32 are completely separated from the partition grooves 119 and then rotate clockwise as shown in FIG. 14. The push rod 20 is released, the elastic member 40 drives the rotor 30 to move axially toward the push rod hole 113 until the inclined surfaces of the tooth blocks 32 resist the guide blocks 116, therefore the tooth blocks 32 continue to rotate clockwise as shown in FIG. 14 until the tooth blocks 32 rotate to the partition grooves 119, and the tooth blocks 32 continue to move axially under the action of the elastic member 40 such that the tooth blocks 32 engage the partition grooves 119 to reach the third stop position. From the second stop position to the third stop position, the rotor 30 rotates clockwise by approximately 120 degrees as shown in FIG. 14. At the third stop position, the first retaining wall 331 blocks about 80% of area of the water inlet hole 1113, about 20% of the first gap 341 is opposite to the water inlet hole 1113, and the second retaining wall 332 completely blocks the water outlet hole 1114. Since the clearance 161 of 0.3 mm is formed between the retaining wall 33 and the inner wall of the valve cavity 16 near the water outlet hole 1114, a dripping channel is formed. As a result, although the retaining wall 33 blocks the water outlet hole 1114, water cannot be completely prevented from passing at a low flow rate, so that the dripping function is realized.

During return from the third stop position of FIG. 14 to the first stop position of FIG. 12, the same process is experienced. The push rod 20 is pressed, the push blocks 22 press the inclined surfaces of the tooth blocks 32 at the third stop position, and the rotor 30 moves axially toward the second end cap 14 until the tooth blocks 32 are completely separated from the partition grooves 119 and then rotate clockwise as shown in FIG. 12. In this process, it should be noted that the water outflow control assembly 100 is in a dripping state when the rotor is at the third stop position, the tooth blocks 32 cannot rotate when the push blocks 22 press the tooth blocks 32 until the tooth blocks 32 are completely separated from the partition grooves 119. Since the retaining wall 33 has a conical surface of which the cone top faces the push rod hole, and the clearance between the retaining wall 33 and the inner wall of the valve cavity 16 near the water outlet hole 1114 becomes large along with the movement of the rotor 30 toward the second end cap 14, the amount of water can be increased without the rotation of the rotor 30, and the quick opening function is realized.

FIG. 15 to FIG. 19 show the difference of a second embodiment from the first embodiment of the water outflow control assembly 100 according to the present application. Structurally speaking, the main difference of the second embodiment from the first embodiment lies in that an outer wall surface of the retaining wall 33 of the rotor 30 is a cylindrical surface, and meanwhile the inner wall of the valve cavity 16 is further provided with a dripping groove 162 above the water outlet hole 1114. One end of the dripping groove 162 is opened in the water outlet hole 1114, and the other end of the dripping groove 162 crosses over the retaining wall 33 to communicate with the valve cavity 16, thereby forming a dripping channel. Of course, the dripping groove 162 can also be formed in a circumferential direction of the inner wall of the valve cavity, as long as the dripping groove 162 can communicate with the valve cavity 16 and the water outlet hole 1114 at the third stop position. It should be pointed out that the second embodiment of the water outflow control assembly 100 cannot realize the quick opening function. This is because the blocked area of the water outlet hole 1114 cannot be changed, although the retaining wall 33 moves down when the push blocks 22 press the tooth blocks 32 until the tooth blocks 32 are completely separated from the partition grooves 119.

Figure 20:
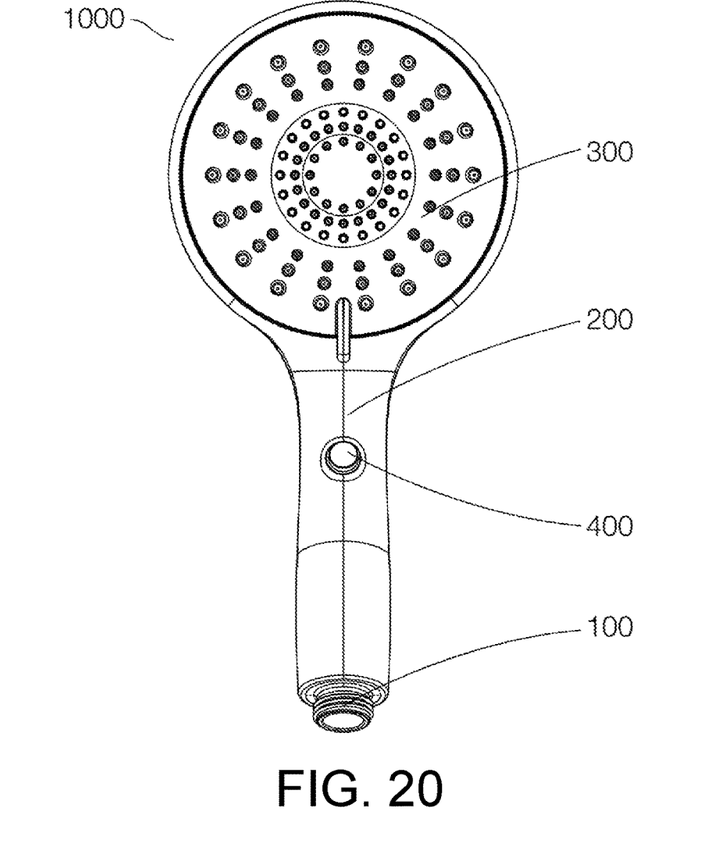
FIG. 20 is a main view of a shower head according to an embodiment of the disclosure.
Figure 21:
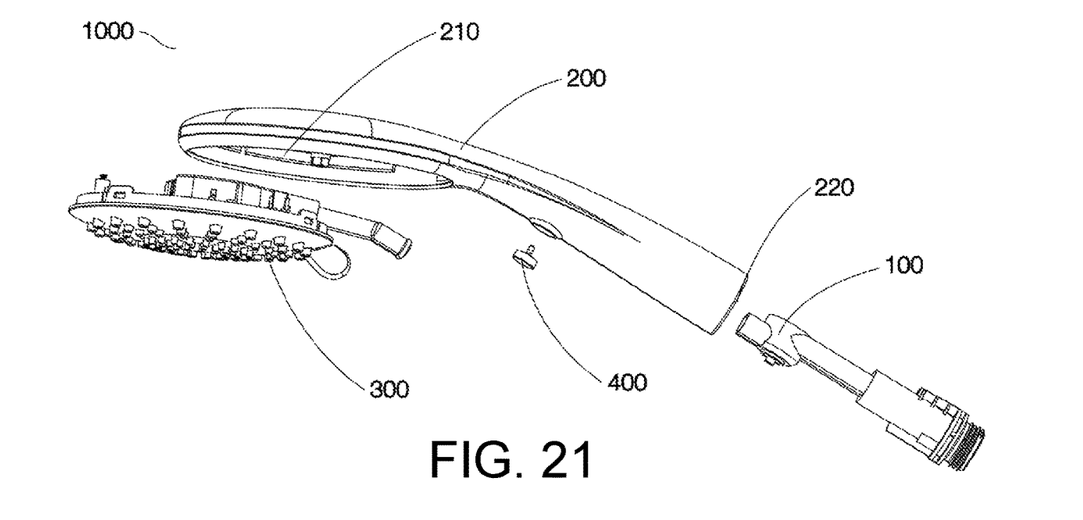
FIG. 21 is an assembling schematic view of the shower head according to the embodiment of the disclosure.

FIG. 20 and FIG. 21 show an embodiment of a shower head 1000. As shown in FIG. 20 and FIG. 21, the shower head 1000 includes a shower head body 200, a surface cover assembly 300, a button 400, and the water outflow control assembly 100 described in the above-mentioned first embodiment or second embodiment.

As shown in FIG. 21, the shower head body 200 is provided with a surface cover hole 210, a handle hole 220, and a button hole. The button hole is formed in a handle of the shower head body 200, which is convenient for a user holding the shower head to press and control the water. The surface cover assembly 300 is installed from the surface cover hole 210 of the shower head body 200 and is fixedly connected to the shower head body 200. It should be noted that in the present embodiment, a sealing ring is arranged at a tail water outlet channel of the surface cover assembly 300 to achieve sealing communication with the water inlet channel 111 of the water outflow control assembly 100. The water outflow control assembly 100 is installed from the handle hole 220 of the shower head body and is fixedly connected to the shower head body, the water inlet channel 111 needs to hermetically communicate with the water outlet channel of the surface cover assembly 300 through the above-mentioned sealing ring 20, and meanwhile the push rod 20 is opposite to the button hole. The button 400 is installed opposite to the button hole, the button 400 is provided with a column shaft, and the column shaft is inserted into the button mounting hole 24 of the push rod 20 to realize fixed connection of the button 400 and the push rod 20.

By adopting the shower head 1000 of the above structure, the shower head body does not need to be separately manufactured, and the shower head body can be injection-molded at a time, thereby improving the overall aesthetics of the shower head.

When the shower head 1000 is assembled, the water outflow control assembly 100 is installed through the handle hole 220 of the shower head body 200 and is connected and communicates with the surface cover assembly 300 that is installed from the surface cover hole 210 of the shower head body 200, meanwhile, the push rod 20 of the water outflow control assembly 100 is opposite to the button hole, and such assembly method can achieve the purpose of the present invention that the shower head body does not need to be manufactured separately to ensure the overall aesthetics of the shower head.

Compared with the prior art, the embodiments of the present application have the following beneficial effects:

The present application changes the design scheme in the background art that the retaining wall of the rotor and the tooth blocks extend in opposite directions into the scheme that both the retaining wall and the tooth blocks extend toward the push rod hole, so that the thickness of the rotor is reduced, the thickness of the valve cavity is further reduced, and the entire water outflow control assembly can be installed into the shower head body from the handle hole of the shower head body. In addition, the present application further defines a structure, that is, guide blocks enabling the tooth blocks to continue to rotate to the next stop position during the axial reset process. The guide blocks surround the push rod hole, so that the structure is very compact, and the entire water outflow control assembly is axially thinner.

In the present application, the push blocks are designed to extend in the radial direction of the push rod and non-rotatably connected to the partition grooves in a sliding manner. With this arrangement, the push blocks can be retracted into the partition grooves to give way to the tooth block, so that the tooth block can press against the guide blocks and slide into the partition grooves. Through such a design, the structure is more compact, the entire water outflow control assembly is axially thinner, moreover, the tooth block can enter the stop position more reliably, and the operation of the entire axial displacement rotating mechanism is more reliable.

Considering that the axial movement of the push blocks may result in separation from the partition grooves, the stop wall is provided to ensure the non-rotatable connection between the push blocks separated from the partition grooves and the water inlet body. Of course, the axial movement of the push blocks does not necessarily result in separation from the partition grooves, so the stop wall is not necessary.

The push blocks, the rotor, and the elastic member are conveniently installed into the valve cavity through the second end cap. The sealing and sliding connection of the push rod to the water inlet seat is achieved by placing the first sealing ring in the first sealing ring groove.

The retaining wall is in clearance fit with the inner wall of the valve cavity near the water outlet hole to change the blocking area of the water outlet hole so as to change the degree of blockage of the water inlet channel.

The outer wall of the retaining wall is designed into a conical surface, and when the push rod pushes the rotor to move down axially, the clearance between the retaining wall and the inner wall of the valve cavity near the water outlet hole can be changed without the rotation of the rotor, the clearance becomes larger and the water outlet hole is opened, thus achieving the quick opening function.

Three blocking states are formed through the three stop positions, thereby achieving the flow adjustment function.

The dripping channel is formed between the retaining wall and the water outlet hole to achieve the dripping function.

The dripping channel is formed by providing a dripping groove in the inner wall of the valve cavity, the dripping amount can be controlled by controlling the depth and width of the dripping groove, and this structure is less sensitive to the dimensional tolerance of machining.

The dripping function is realized by setting the clearance distance between the inner wall of the valve cavity and the retaining wall. More importantly, when the outer surface of the retaining wall is a conical surface, since the angle between the conical surface and the rotating shaft is small, even if the axial mounting dimensional tolerance is relatively large, a clearance distance to the retaining wall changes little. Therefore, when the outer surface of the retaining wall is a conical surface, the structure of adjusting the dripping flow through the clearance is less sensitive to the axial mounting dimensional tolerance.

The shower head adopts the above water outflow control assembly. Since the button is additionally installed, a height of the button does not affect the installation of the water outflow control assembly from the handle hole. With the technical solution, the manufacturing process of the shower head is simpler, and the integrally manufactured shower head body can also be used to achieve a more attractive effect.

Since the water outflow control assembly is installed through the handle hole of the shower head body, a joint line is no longer formed on the shower head body, the appearance is attractive, and dirt is unlikely to hide during bathing.

The descriptions of the above specification and the embodiments are used for interpreting the protection scope of the present application, but do not constitute a limitation to the protection scope of the present application. The present application or the above embodiments teach that modifications, equivalent substitutions or other improvements made to the embodiments of the present application or some of the technical features by those of ordinary skill in the art in combination with common knowledge, common technical knowledge in the art and/or the prior art through logical analysis, reasoning or limited experimentation shall fall within the protection scope of the present application.

What is claimed is:

1. A water outflow control assembly, comprising:
a water inlet body, provided with a water inlet channel and a valve cavity that intersects with the water inlet channel, one end of the valve cavity being provided with a push rod hole, and a plurality of guide blocks being arranged around the push rod hole;
a push rod, penetrating through the push rod hole and non-rotatably connected to the water inlet body in a sealing and sliding manner, a plurality of push blocks being arranged at one end of the push rod extending into the valve cavity;
a rotor, provided with a plurality of tooth blocks that extend toward the push rod hole and that have inclined surfaces, a retaining wall extending toward the push rod hole and provided with a gap being further arranged on an outer periphery of the rotor, the retaining wall being in clearance fit with an inner wall of the valve cavity, and a rotation of the rotor changing an area of the water inlet channel being blocked by the retaining wall; and
an elastic member, resisting between the rotor and the other end of the valve cavity;
wherein when the push rod is pressed, the push blocks urge against the tooth blocks at a stop position, so that the rotor moves axially and rotates; and when the push rod is released, the elastic member drives the rotor to reset axially, and the tooth blocks resist the guide blocks and continue to rotate to a next stop position
wherein a stop wall extending toward the rotor is arranged around the guide blocks in the valve cavity, the retaining wall surrounds the tooth blocks, and the rotor is formed with an accommodating groove between the retaining wall and the tooth blocks for accommodating the stop wall,
a distance between a top surface of the rotor to the inclined surface of each tooth block is smaller than a distance between the top surface of the rotor to a bottom surface of the retaining wall.

2. The water outflow control assembly according to claim 1, wherein
partition grooves are formed between the guide blocks;
the push blocks are configured to extend in a radial direction of the push rod and non-rotatably connected to the partition grooves in a sliding manner;
the tooth blocks match the partition grooves;
at the stop position, the push blocks and the tooth blocks are both located in the partition grooves; when the push rod is pressed, the push blocks urge against the tooth blocks to move axially until the tooth blocks are separated from the partition grooves and then rotate; and when the push rod is released, the tooth blocks are axially reset and resist the guide blocks, then continue to rotate and slide into the partition grooves to the next stop position.

3. The water outflow control assembly according to claim 2, wherein
stop grooves correspondingly matching the partition grooves are formed in an inner wall of the stop wall;
the push blocks are further connected to the stop grooves in a sliding manner.

4. The water outflow control assembly according to claim 3, wherein the water inlet body comprises a water inlet seat, a first end cap and a second end cap;
the water inlet seat is provided with the water inlet channel and a valve cavity groove intersecting with the water inlet channel, the valve cavity groove is closed at one end and open at the other end, the push rod hole is formed at the closed end of the valve cavity groove, and a first end cap groove is formed on a periphery of a side of the push rod hole away from the valve cavity groove;
the first end cap is fixedly connected into the first end cap groove; and
the second end cap is hermetically connected and matches with the open end of the valve cavity groove to form the valve cavity.

5. The water outflow control assembly according to claim 2, wherein the water inlet body comprises a water inlet seat, a first end cap and a second end cap;
the water inlet seat is provided with the water inlet channel and a valve cavity groove intersecting with the water inlet channel, the valve cavity groove is closed at one end and open at the other end, the push rod hole is formed at the closed end of the valve cavity groove, and a first end cap groove is formed on a periphery of a side of the push rod hole away from the valve cavity groove;
the first end cap is fixedly connected into the first end cap groove; and
the second end cap is hermetically connected and matches with the open end of the valve cavity groove to form the valve cavity.

6. The water outflow control assembly according to claim 2, wherein the water inlet channel intersects with the valve cavity to form a water inlet hole and a water outlet hole; and the retaining wall is in clearance fit with the inner wall of the valve cavity near the water outlet hole, and changes an blocking area of the water outlet hole to change the degree of blocking the water inlet channel.

7. The water outflow control assembly according to claim 6, wherein an outer wall of the retaining wall is provided as a conical surface, a cone top of the conical surface faces the push rod hole, and correspondingly, the inner wall of the valve cavity near the water outlet hole is also provided as a conical surface matching the outer wall of the retaining wall.

8. The water outflow control assembly according to claim 7, wherein numbers of the tooth blocks and the partition grooves are three, and three tooth blocks and three partition grooves are provided to form three stop positions; at a first stop position, the retaining wall does not block the water outlet hole; at a second stop position, the retaining wall partially blocks the water outlet hole; and at a third stop position, the retaining wall completely blocks the water outlet hole.

9. The water outflow control assembly according to claim 7, wherein when the retaining wall completely blocks the water outlet hole, a dripping channel is formed between the retaining wall and the water outlet hole.

10. The water outflow control assembly according to claim 6, wherein numbers of the tooth blocks and the partition grooves are three, and three tooth blocks and three partition grooves are provided to form three stop positions; at a first stop position, the retaining wall does not block the water outlet hole; at a second stop position, the retaining wall partially blocks the water outlet hole; and at a third stop position, the retaining wall completely blocks the water outlet hole.

11. The water outflow control assembly according to claim 6, wherein when the retaining wall completely blocks the water outlet hole, a dripping channel is formed between the retaining wall and the water outlet hole.

12. The water outflow control assembly according to claim 11, wherein the dripping channel is a dripping groove, the dripping groove is formed in the inner wall of the valve cavity, one end of the dripping groove is opened to the water outlet hole, and the other end of the dripping groove crosses over the retaining wall that blocks the water outlet hole to communicate with the valve cavity.

13. The water outflow control assembly according to claim 11, wherein a clearance between the retaining wall and the inner wall of the valve cavity near the water outlet hole is 0.1 mm to 0.4 mm, and the dripping channel is formed by the clearance.

14. The water outflow control assembly according to claim 1, wherein the water inlet body comprises a water inlet seat, a first end cap and a second end cap;
the water inlet seat is provided with the water inlet channel and a valve cavity groove intersecting with the water inlet channel, the valve cavity groove is closed at one end and open at the other end, the push rod hole is formed at the closed end of the valve cavity groove, and a first end cap groove is formed on a periphery of a side of the push rod hole away from the valve cavity groove;
the first end cap is fixedly connected into the first end cap groove; and
the second end cap is hermetically connected and matches with the open end of the valve cavity groove to form the valve cavity.

15. A shower head, comprising: a shower head body, a surface cover assembly, a button, and the water outflow control assembly according to claim 1, wherein
the shower head body is provided with a surface cover hole, a handle hole and a button hole, and the button hole is formed in a handle of the shower head body;
the surface cover assembly is installed from the surface cover hole of the shower head body and then is fixedly connected to the shower head body;
the water outflow control assembly is installed from the handle hole of the shower head body and then is fixedly connected to the shower head body, the water inlet channel is hermetically communicated to a water outlet channel of the surface cover assembly, and the push rod of the water outflow control assembly is opposite to the button hole;
the button is installed at a position of the button hole and is fixedly connected to the push rod.

16. A water outflow control assembly, comprising:
a water inlet body, provided with a water inlet channel and a valve cavity that intersects with the water inlet channel, one end of the valve cavity being provided with a push rod hole, and a plurality of guide blocks being arranged around the push rod hole;
a push rod, penetrating through the push rod hole and non-rotatably connected to the water inlet body in a sealing and sliding manner, a plurality of push blocks being arranged at one end of the push rod extending into the valve cavity;

a rotor, provided with a plurality of tooth blocks that extend toward the push rod hole and that have inclined surfaces, a retaining wall extending toward the push rod hole and provided with a gap being further arranged on an outer periphery of the rotor, the retaining wall being in clearance fit with an inner wall of the valve cavity, and a rotation of the rotor changing an area of the water inlet channel being blocked by the retaining wall; and an elastic member, resisting between the rotor and the other end of the valve cavity;

wherein when the push rod is pressed, the push blocks urge against the tooth blocks at a stop position, so that the rotor moves axially and rotates; and when the push rod is released, the elastic member drives the rotor to reset axially, and the tooth blocks resist the guide blocks and continue to rotate to a next stop position, partition grooves are formed between the guide blocks;

the push blocks are configured to extend in a radial direction of the push rod and non-rotatably connected to the partition grooves in a sliding manner;

the tooth blocks match the partition grooves;

at the stop position, the push blocks and the tooth blocks are both located in the partition grooves; when the push rod is pressed, the push blocks urge against the tooth blocks to move axially until the tooth blocks are separated from the partition grooves and then rotate; and when the push rod is released, the tooth blocks are axially reset and resist the guide blocks, then continue to rotate and slide into the partition grooves to the next stop position, the water inlet channel intersects with the valve cavity to form a water inlet hole and a water outlet hole; and the retaining wall is in clearance fit with the inner wall of the valve cavity near the water outlet hole, and changes an blocking area of the water outlet hole to change the degree of blocking the water inlet channel, wherein when the retaining wall completely blocks the water outlet hole, a dripping channel is formed between the retaining wall and the water outlet hole, the dripping channel is a dripping groove, the dripping groove is formed in the inner wall of the valve cavity, one end of the dripping groove is opened to the water outlet hole, and the other end of the dripping groove crosses over the retaining wall that blocks the water outlet hole to communicate with the valve cavity.

\* \* \* \* \*